(12) United States Patent
Watanabe et al.

(10) Patent No.: US 10,713,678 B2
(45) Date of Patent: Jul. 14, 2020

(54) METHOD, SYSTEM AND MOBILE DEVICE FOR PROVIDING USER REWARDS

(71) Applicant: TenTen Kabushiki Kaisha, Tokyo (JP)

(72) Inventors: Benjamin Koji Watanabe, Kawasaki (JP); Anthony Edward Weiss, Tokyo (JP)

(73) Assignee: TENTEN KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 15/192,128

(22) Filed: Jun. 24, 2016

(65) Prior Publication Data

US 2016/0358200 A1  Dec. 8, 2016

Related U.S. Application Data

(63) Continuation of application No. 15/036,348, filed as application No. PCT/JP2013/006735 on Nov. 15, 2013.

(51) Int. Cl.
*G06Q 30/02* (2012.01)
*H04W 76/10* (2018.01)
*G06Q 20/32* (2012.01)
*G06Q 20/38* (2012.01)
(Continued)

(52) U.S. Cl.
CPC ....... *G06Q 30/0226* (2013.01); *G06Q 20/204* (2013.01); *G06Q 20/322* (2013.01); *G06Q 20/3278* (2013.01); *G06Q 20/387* (2013.01); *G06Q 20/40* (2013.01); *G06Q 20/401* (2013.01); *G06Q 30/0213* (2013.01); *G06Q 30/0233* (2013.01); *G06Q 30/0236* (2013.01); *G06Q 30/0238* (2013.01); *H04W 76/10* (2018.02)

(58) Field of Classification Search
CPC ...................................................... H04W 76/10
See application file for complete search history.

(56) References Cited

U.S. PATENT DOCUMENTS 6,085,168 A * 7/2000 Mori ...................... G06Q 20/02
                                                              705/17
6,370,380 B1 * 4/2002 Norefors ............... H04L 63/126
                                                              455/436
7,076,209 B2   7/2006 Sugikawa et al.
(Continued)

FOREIGN PATENT DOCUMENTS

EP   2 189 932 A1   5/2010
JP   2001-325508 A  11/2001
(Continued)

OTHER PUBLICATIONS

Japanese Office Action dated Mar. 17, 2017, issued in corresponding Japanese Patent Application No. 2016-523348 and English summary of the same. (5 pages).
(Continued)

*Primary Examiner* — Michael J Sittner
(74) *Attorney, Agent, or Firm* — Holtz, Holtz & Volek PC

(57) ABSTRACT

The transaction system provides user a reward. The mobile device transmits the reward request including the user ID to the ePOS, the ePOS transmits the transaction data to the mobile device, the mobile device forwards the transaction data to the server, the server verifies the transaction data, the server transmits the reward data to the mobile device, the mobile device stores points.

10 Claims, 10 Drawing Sheets

(51) Int. Cl.
*G06Q 20/20* (2012.01)
*G06Q 20/40* (2012.01)

(56) References Cited

U.S. PATENT DOCUMENTS

| | | | |
|---|---|---|---|
| 7,488,946 | B2 | 2/2009 | Hennessy et al. |
| 7,495,227 | B2 | 2/2009 | Hennessy et al. |
| 10,119,859 | B2 | 11/2018 | Suzuki et al. |
| 2002/0120497 | A1* | 8/2002 | King .................. G06Q 30/02 705/14.27 |
| 2003/0018488 | A1 | 1/2003 | Elhaoussine et al. |
| 2003/0163374 | A1 | 8/2003 | Akiyama |
| 2004/0249758 | A1 | 12/2004 | Sukeda et al. |
| 2005/0036599 | A1 | 2/2005 | Van Der Valk |
| 2005/0065851 | A1 | 3/2005 | Aronoff et al. |
| 2006/0213975 | A1 | 9/2006 | Krishnan et al. |
| 2007/0022058 | A1 | 1/2007 | Labrou et al. |
| 2007/0203792 | A1 | 8/2007 | Rao |
| 2007/0206209 | A1 | 9/2007 | Mount |
| 2008/0078939 | A1 | 4/2008 | Hennessy et al. |
| 2008/0078940 | A1 | 4/2008 | Castleberry et al. |
| 2008/0109372 | A1 | 5/2008 | Bykov et al. |
| 2009/0144161 | A1 | 6/2009 | Fisher |
| 2009/0222300 | A1* | 9/2009 | Guith .................. G06Q 30/02 705/35 |
| 2009/0222340 | A1* | 9/2009 | Insola ............... G06Q 30/0231 705/14.31 |
| 2010/0188975 | A1* | 7/2010 | Raleigh .............. G06Q 30/0207 370/230.1 |
| 2011/0251910 | A1* | 10/2011 | Dimmick ............... G06Q 30/02 705/17 |
| 2012/0239479 | A1 | 9/2012 | Amaro et al. |
| 2013/0054336 | A1 | 2/2013 | Graylin |
| 2013/0080334 | A1 | 3/2013 | Lee et al. |
| 2013/0254102 | A1* | 9/2013 | Royyuru ................ G06Q 30/02 705/39 |
| 2013/0262317 | A1 | 10/2013 | Collinge et al. |
| 2014/0074581 | A1* | 3/2014 | Johnson ................ G06Q 30/02 705/14.33 |
| 2015/0012425 | A1 | 1/2015 | Mathew |
| 2015/0242844 | A1 | 8/2015 | Yisraelian et al. |
| 2019/0025116 | A1 | 1/2019 | Suzuki et al. |

FOREIGN PATENT DOCUMENTS

| | | |
|---|---|---|
| JP | 2002-329136 A | 11/2002 |
| JP | 2003-256704 A | 9/2003 |
| JP | 2003-333666 A | 11/2003 |
| JP | 2004-514989 A | 5/2004 |
| JP | 2004-362084 A | 12/2004 |
| JP | 2005-18099 A | 1/2005 |
| JP | 2008090304 | 4/2008 |
| JP | 2008096998 A | 4/2008 |
| JP | 2009020099 A | 1/2009 |
| JP | 2010262134 A | 11/2010 |
| JP | 2011058999 A | 3/2011 |
| JP | 2011059058 A | 3/2011 |
| JP | 2011-141853 A | 7/2011 |
| JP | 2011-238065 A | 11/2011 |
| JP | 2012-14272 A | 1/2012 |
| JP | 2012-168611 A | 9/2012 |
| JP | 2012-256357 A | 12/2012 |
| JP | 2013257198 A | 12/2013 |
| JP | 2014066555 A | 4/2014 |
| JP | 2017036968 A | 2/2017 |
| WO | 03/044711 A1 | 5/2003 |

OTHER PUBLICATIONS

Japanese Office Action dated Jun. 20, 2017, issued in corresponding Japanese Patent Application No. 2016-101785 and English summary of the same. (11 pages).
Tatsuaki Okamoto, et al., "Series: Mathematics of Information Science—Modern Cryptography", Japan, Sangyo Tosho Publishing Co., Ltd., Jun. 30, 1998, 1st Edition, 2nd impression, pp. 198-199.
Yoshinobu Kato, Yamato Transport Co.,Ltd., "Real-time Distribution Information—Automatic transmission of POS data from au mobiles", Nikkei Communications, Japan, Nikkei Business Publications, Inc., Jul. 1, 2005, No. 441, p. 76.
International Search Report and Written Opinion dated Jul. 3, 2014 for PCT/JP2013/006735. (10 pages).
European Search Report dated Dec. 12, 206 for corresponding European Patent Application No. 16171368.0. (9 pages).
U.S. Appl. 15/036,348; Non-Final Office Action dated Jun. 25, 2018.
JPO; Japanese Patent Application No. 2016-523348; Japanese Office Action dated Aug. 17, 2018.
U.S. Appl. No. 15/036,348; Office Action dated May 31, 2019.
Japanese Office Action (and English language translation thereof) dated Mar. 27, 2020 issued in Japanese Application No. 2019-095522.
Notice of Allowance dated May 13, 2020 issued in related U.S. Appl. No. 15/036,348.

* cited by examiner

[Fig. 1]
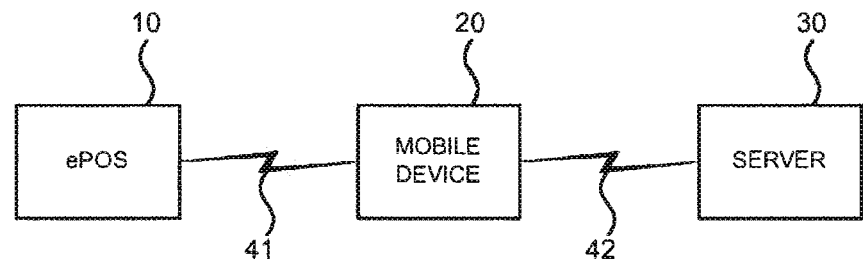
[Fig. 2]
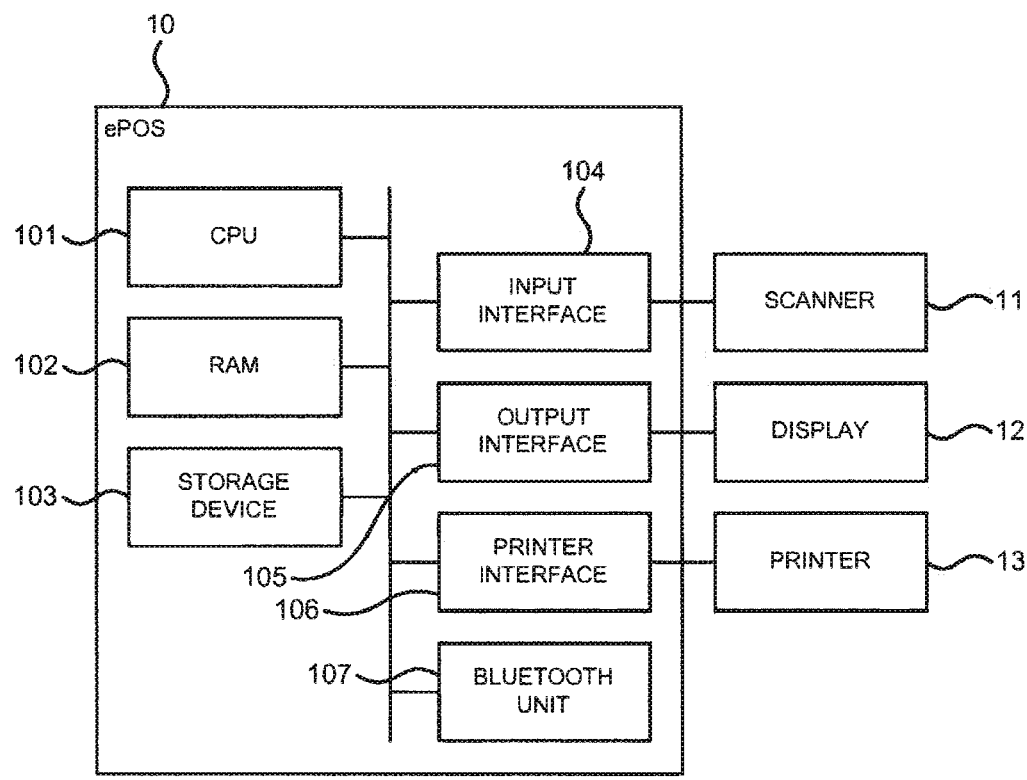

[Fig. 3]
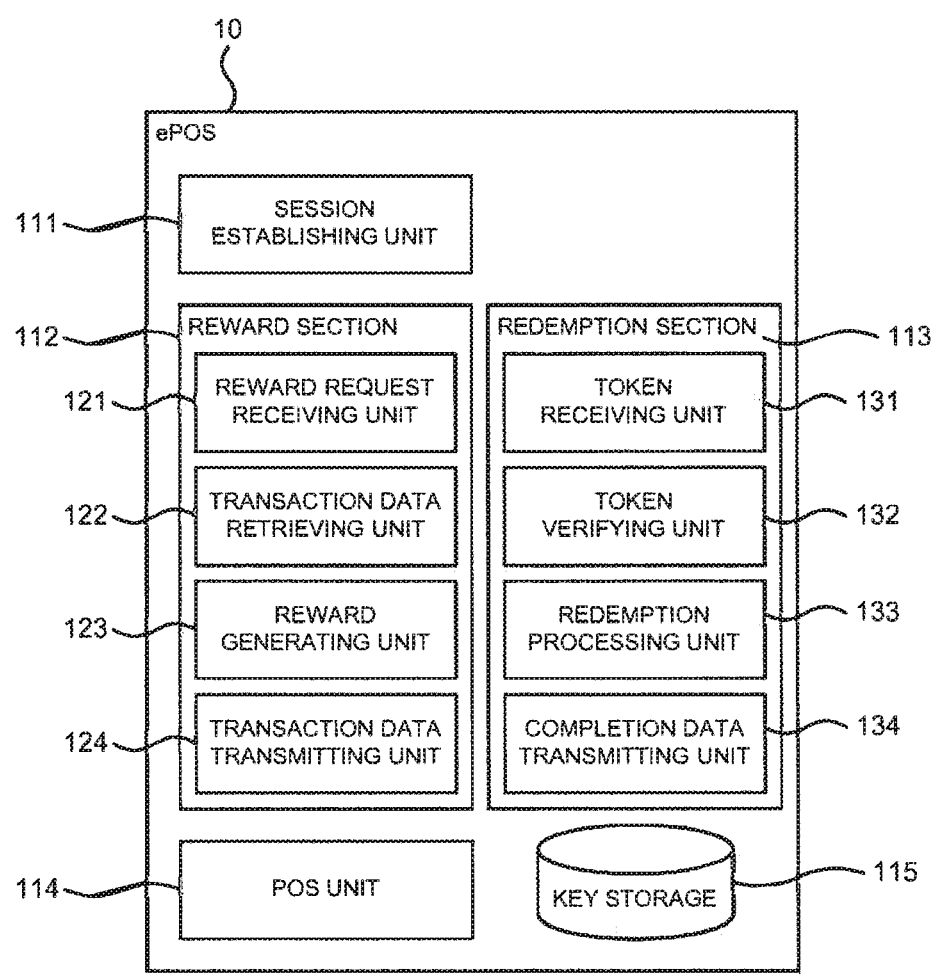

[Fig. 4]
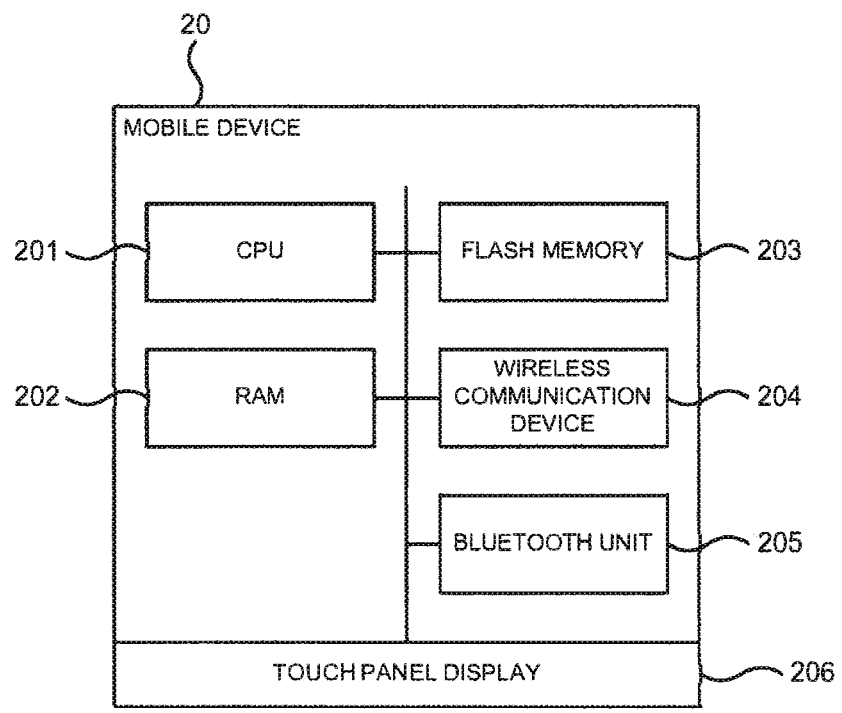

[Fig. 5]
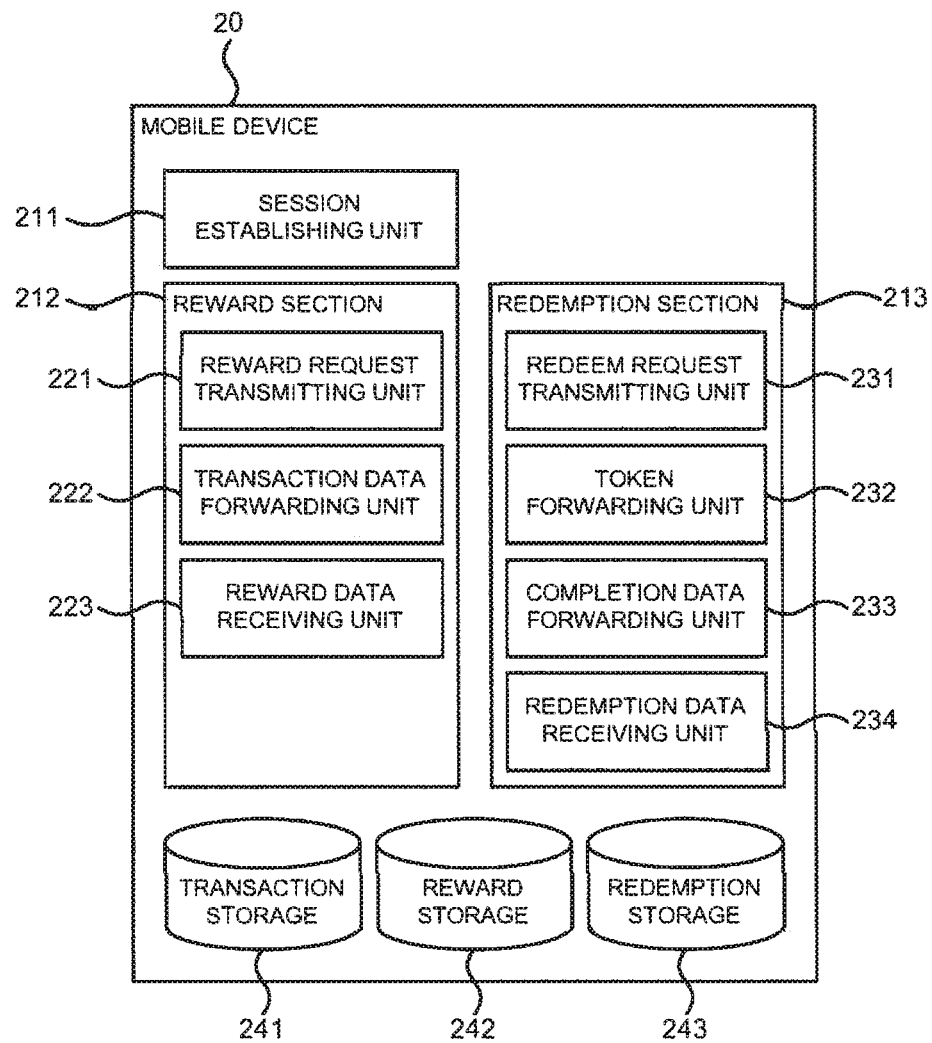
[Fig. 6]
TRANSACTION STORAGE 241
| DATETIME | BRAND | TRANSACTION | POINTS |
|---|---|---|---|
| 2013/10/01 12:15 | xxxx | purchase JPY1,000. | 10 points |
| ... | ... | ... | ... |

[Fig. 7]
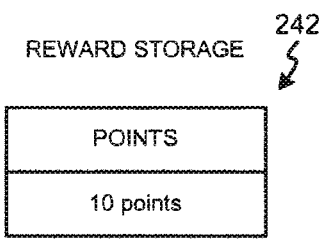
[Fig. 8]
[Fig. 9]
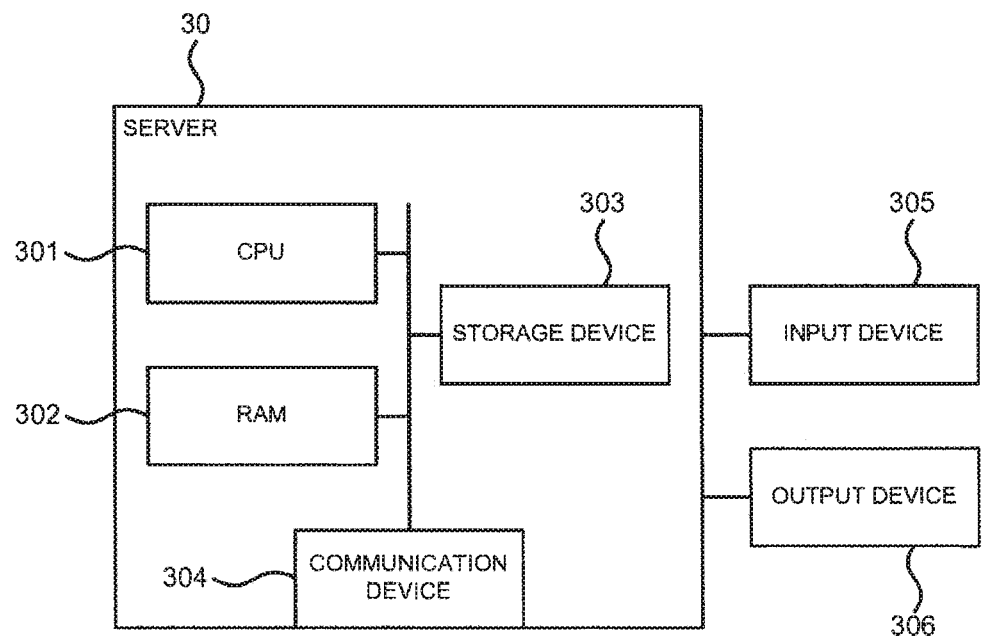

[Fig. 10]
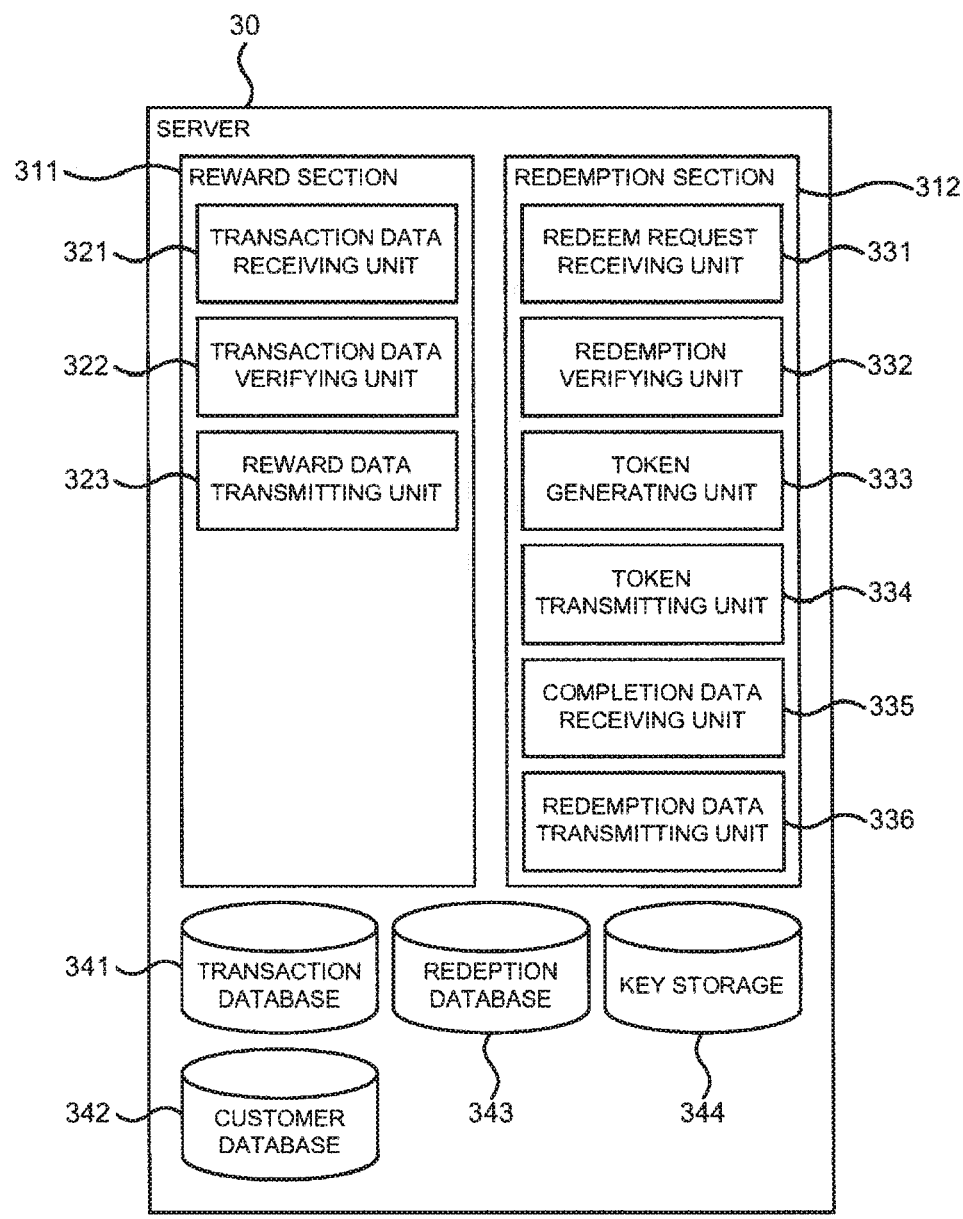

[Fig. 11]

TRANSACTION DATABASE 341

| USER ID | DATETIME | BRAND | TRANSACTION | POINTS |
|---|---|---|---|---|
| U0001 | 2013/10/01 12:15 | xxxx | purchase JPY1,000. | 10 points |
| ... | ... | ... | ... | ... |

[Fig. 12]

CUSTOMER DATABASE 342

| USER ID | USERNAME | PASSWORD | POINTS |
|---|---|---|---|
| U0001 | foobar | xxxxxxxx | 10 points |
| ... | ... | ... | ... |

[Fig. 13]

REDEMPTION DATABASE 343

| USER ID | DATETIME | BRAND | POINTS |
|---|---|---|---|
| U0001 | 2013/10/01 12:15 | xxxx | 5 points |
| ... | ... | ... | ... |

[Fig. 14]
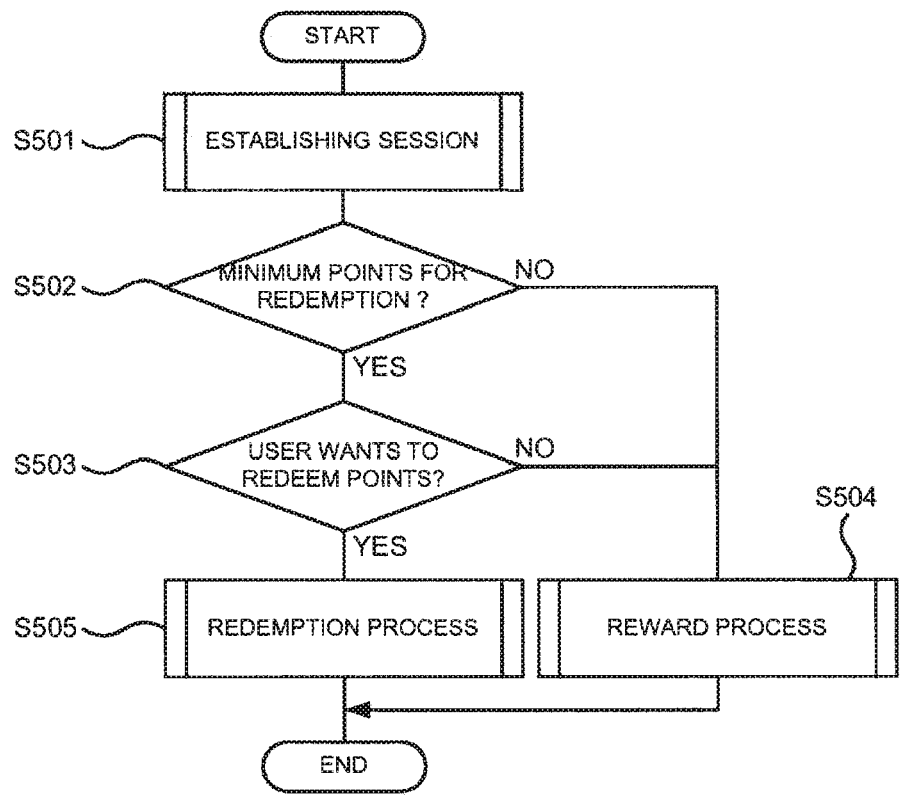
[Fig. 15]
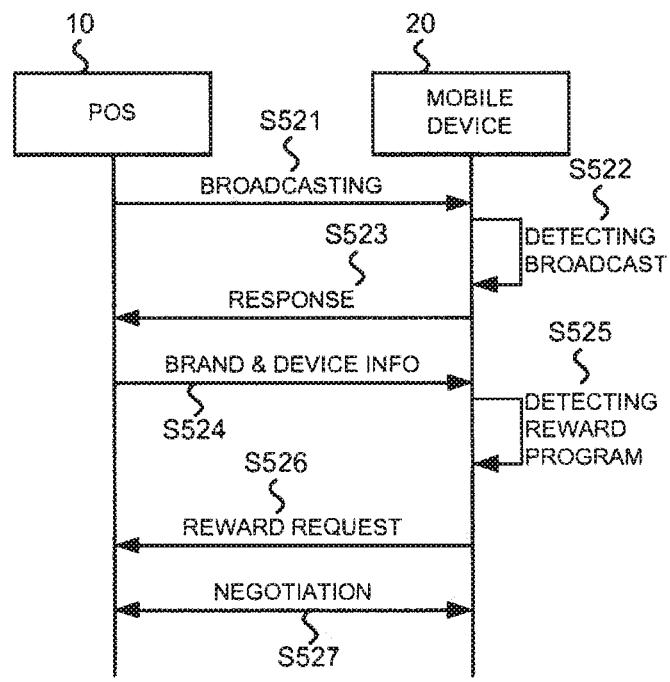

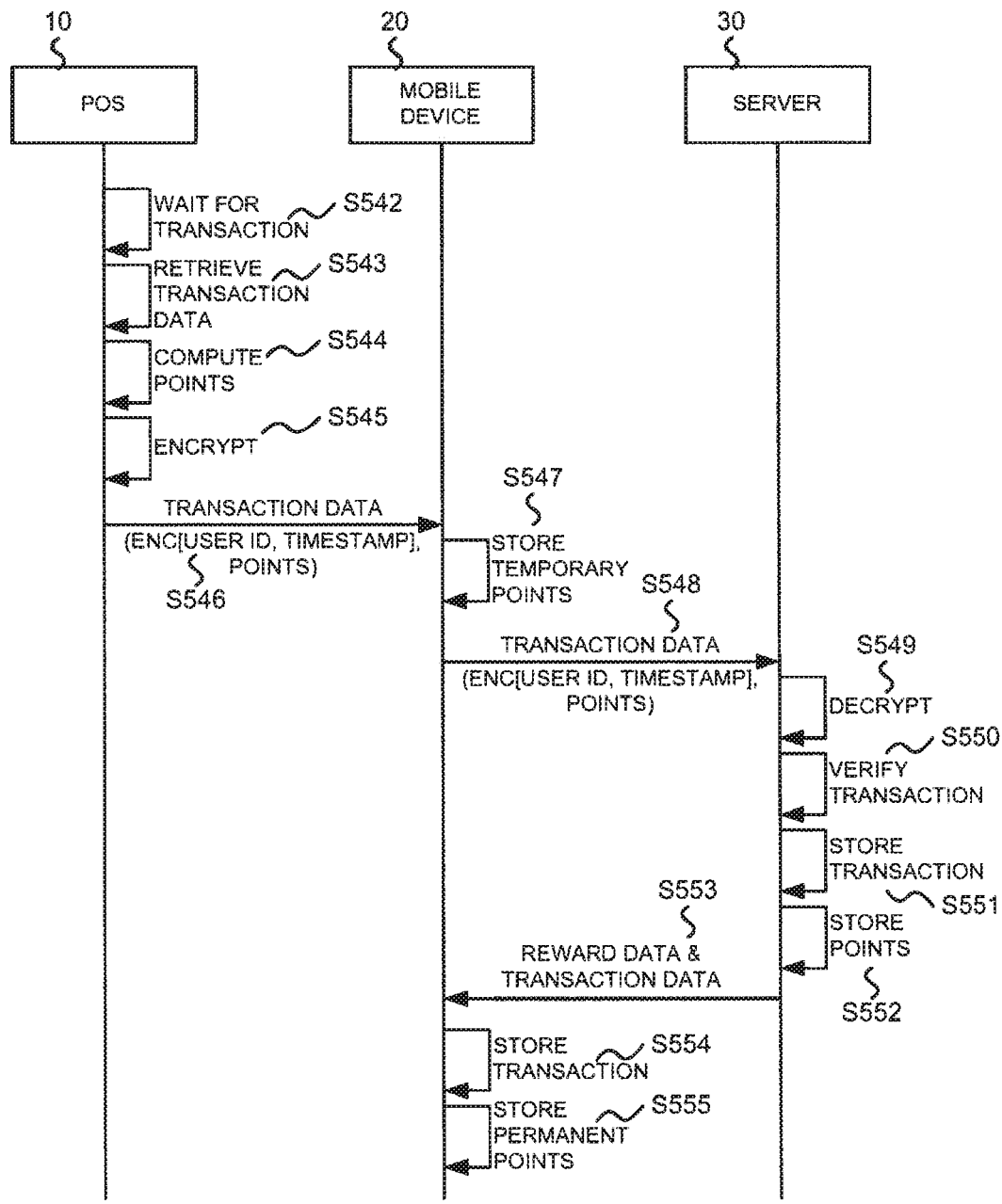
[Fig. 16]

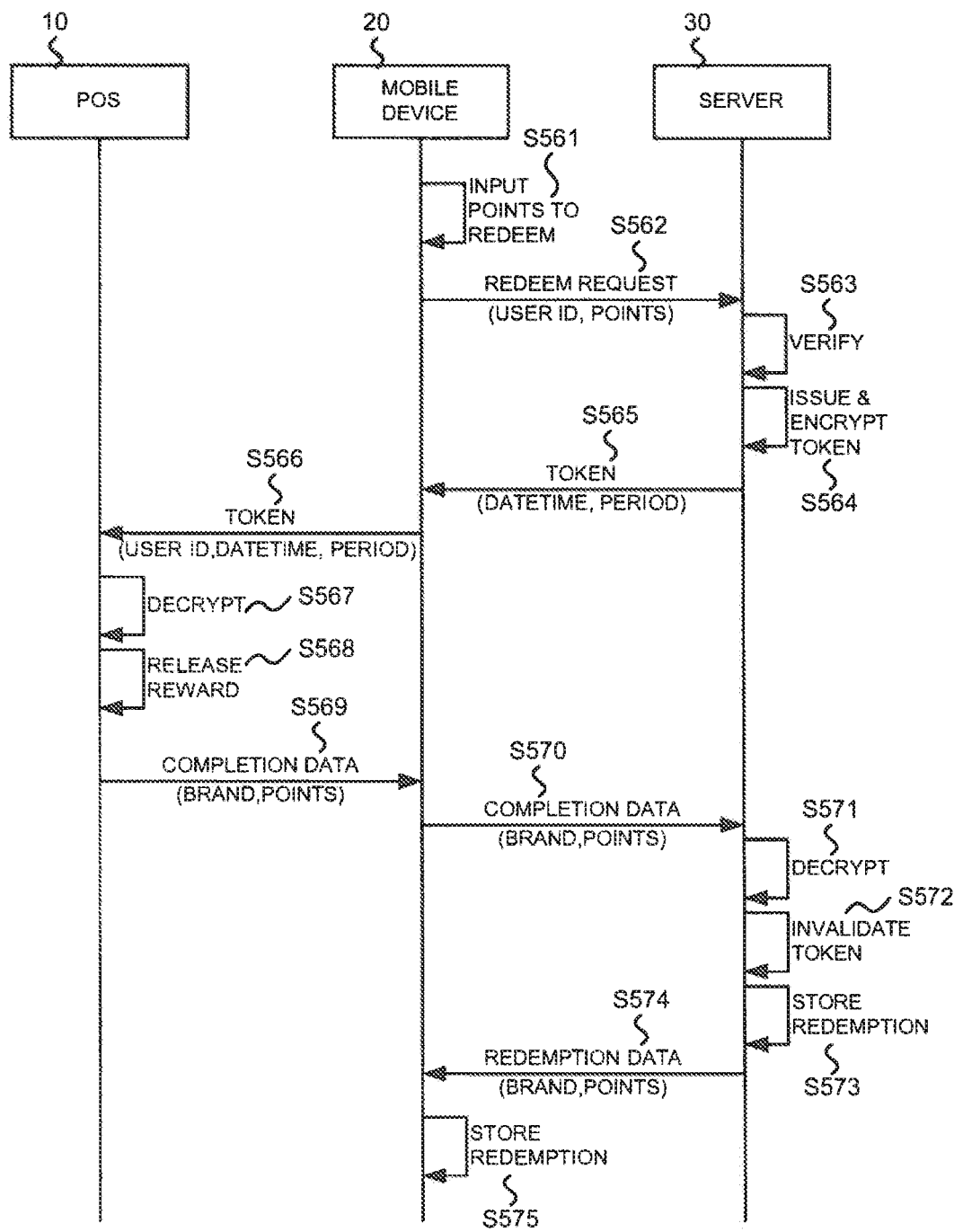
[Fig. 17]

METHOD, SYSTEM AND MOBILE DEVICE FOR PROVIDING USER REWARDS

CROSS-REFERENCE TO RELATED APPLICATIONS

This application is a continuation of U.S. application Ser. No. 15/036,348, filed May 12, 2016, which claims the benefit of the filing date of International Patent Application No. PCT/JP2013/006735, filed Nov. 15, 2013, which are incorporated herein by reference in their entirety.

TECHNICAL FIELD

The present invention relates to a method for providing user rewards.

BACKGROUND ART

Customer loyalty programs give rewards in exchange for stamps, points, or other quantifiable measurements of spending/transactions. The objective is to obtain repeat business and gain insight into customer spending habits and analytics. Some examples of these are physical point/stamp cards, branded/store based credit cards, and custom mobile applications.

SUMMARY OF INVENTION

Existing methods for joining rewards programs and even receiving rewards require additional action both pre- and post-transaction by both vendor and customer, reducing the likelihood of the customer participating in the rewards program. The present invention removes these points of friction by automating the process through wireless communication between transaction device such as a POS system, a cash register or a vending machine and a customer device such as a mobile phone.

The main aspect of the present invention for solving the aforementioned problem is a method for providing user rewards, the method comprising steps of: transmitting data related to the user from a mobile device to a transaction device; transmitting transaction data related to a transaction made in the transaction device from the transaction device to the mobile device; forwarding the transaction data from the mobile device to a server; verifying the transaction data in the server; transmitting reward data indicating the rewards are awarded to the user to the mobile device when the transaction data is verified; and storing reward data in the mobile device.

In the present invention, it is possible to configure that the transaction data is encrypted by the transaction device, and the server decrypts the transaction data to verify the configuration data.

In the present invention, it is possible to configure that the transaction device and the server store a common key, the transaction device uses the key to encrypt the transaction data, and the server uses the key to decrypt the transaction data.

In the present invention, the method may further comprise steps of: generating reward data in the mobile device based on the transaction data before the step of forwarding the transaction data; temporarily storing the reward data in the mobile device; and permanently storing the reward data in the mobile device after the step of transmitting reward data to the mobile device.

In the present invention, the method may further comprise steps of: transmitting redemption data from the mobile device to the server; verifying the redemption data in the server; generating a token according to the redemption data in the server when the redemption data is verified; transmitting the token from the server to the mobile device; forwarding the token from the mobile device to the transaction device; and executing the process of redemption in the transaction device.

Another aspect of the present invention is a system for providing user rewards, the system comprising a transaction device, a mobile device, and a server, the mobile device comprising a reward request transmitting unit for transmitting data related to the user to the transaction device; the transaction device comprising a transaction data transmitting unit for transmitting transaction data related to a transaction made in the transaction device to the mobile device; the mobile device comprising a transaction data forwarding unit for forwarding the transaction data to the server; the server comprising a transaction verifying unit for verifying the transaction data, and a reward data transmitting unit for transmitting to the mobile device reward data indicating the rewards are awarded to the user when the transaction data is verified; and the mobile device comprising a reward data receiving unit for receiving the reward data from the server and storing the reward data in the mobile device.

Another aspect of the present invention is a mobile device comprising: a reward request transmitting unit for transmitting data related to a user to a transaction device; a transaction data forwarding unit for forwarding transaction data related to a transaction made in the transaction device from the transaction device to a server; a reward data receiving unit for receiving a reward data indicating the rewards are awarded to the user, the reward data verified by the server; and a reward data receiving unit for receiving the reward data from the server and storing the reward data in the mobile device.

The other problems and the solutions for the same described by this application are exposed by the Description of Embodiments, the description of the figures, and others.

BRIEF DESCRIPTION OF DRAWINGS

FIG. 1 is an overview of a transaction system as an embodiment regarding the present invention.

FIG. 2 is an example of a hardware configuration of the POS 10.

FIG. 3 is an example of a software configuration of the POS 10.

FIG. 4 is an example of a hardware configuration of the mobile device 20.

FIG. 5 is an example of a software configuration of the mobile device 20.

FIG. 6 is an example of a configuration of the transaction data stored in the transaction storage 241.

FIG. 7 is an example of a configuration of the reward storage 242.

FIG. 8 is an example of a configuration of the redemption storage 243.

FIG. 9 is an example of a hardware configuration of the server 30.

FIG. 10 is an example of a software configuration of the server 30.

FIG. 11 is an example of the transaction data stored in the transaction database 341.

FIG. 12 is an example of a configuration of the customer database 342.

FIG. 13 is an example of a configuration of the redemption database 343.

FIG. 14 is a general outline of processes of the transaction system.

FIG. 15 is a sequence diagram of the session establishment.

FIG. 16 is a sequence diagram of the reward process.

FIG. 17 is a sequence diagram of the redeem process.

DESCRIPTION OF EMBODIMENTS

System Configuration

FIG. 1 shows an overview of a transaction system as an embodiment regarding the present invention. The transaction system comprises a POS (Point Of Sale) which is enabled for wireless communication and providing the rewards program of this embodiment (hereinafter referred to as "ePOS10"), a mobile device 20, and a server 30. In this embodiment, it is assumed that a point reward program is provided, the ePOS 10 issues points to the user according to the purchased amount at a store, the mobile device 20 manages the amount of points in its storage, and the server 30 verifies the rewards and redemption of points.

The ePOS 10 is a transaction device which does transactions such as sales, services, detection of users' visits, and so forth. The ePOS 10 may be a computer such as POS cash register, an interactive kiosk, and so forth. A user is rewarded upon transaction done by the ePOS 10.

The mobile device 20 is a computer such as a smart phone, a tablet computer, a mobile phone, PDA (Personal Digital Assistant), a notebook computer, and so forth which the user brings with him/her. The mobile device 20 executes a computer program which implements managing rewards to the user and transmitting/receiving/forwarding data to/from the ePOS 10 and the server 30.

The ePOS 10 and the mobile device 20 are connected to each other via a wireless channel 41. In this embodiment, it is assumed that the ePOS 10 and the mobile device 20 communicate with each other using Bluetooth (trademark) LE (Low Energy). The mobile device 20 and the server 30 are connected to each other via a wireless channel 42. In this embodiment, it is assumed that the mobile device 20 and the server 30 communicate with each other using WiFi or any mobile phone communication protocol (3G, 4G, LTE, etc) according to TCP/IP protocol. Of course, Bluetooth (trademark), WiFi, NFC (Near Field Communication), and other wireless communication technologies can be used for the communication over wireless channels 41 and 42.

ePOS 10

FIG. 2 shows an example of a hardware configuration of the ePOS 10. As shown FIG. 2, the ePOS 10 includes CPU 101, RAM (Random Access Memory) 102, a storage device 103, an input interface 104, an output interface 105, a printer interface 106, and a Bluetooth (trademark) unit 107. The storage device 103 is for example a hard disk drive, solid state drive, flash memory, and so forth which stores data and programs.

CPU 101 retrieves the program stored in the storage device 103 to RAM 102 and executes the program to realize various functions. The input interface 104 is an interface to connect to the scanner 11. The input interface 104 retrieves data such as EAN (European (International) Article Number) code, JAN (Japanese Article Number) code, GTIN (Global Trade Item Numbers) code, and so forth in compliance with for example USB (Universal Serial Bus) standard. The output interface 105 is an interface to connect to the display 12. The output interface 105 may be an analog interface to output RGB signals or a digital interface to output digital image data in accordance with the display 12. The printer interface 106 is an interface to connect to the printer 13. The ePOS 10 can print a receipt via the printer interface and the printer 13. The Bluetooth (trademark) unit 107 transmits/receives data to/from the channel 41 using Bluetooth (trademark) LE technology.

FIG. 3 shows an example of a software configuration of the ePOS 10. As shown FIG. 3, the ePOS 10 includes a session establishing unit 111, a reward section 112, a redemption section 113, a POS unit 114, and a key storage 115.

The reward section 112, the redemption section 113 and the POS unit 114 are realized for example by CPU 101 retrieving the program stored in the storage device 103 to RAM 102 and executing the program. The key storage 115 is realized for example as a storage area provided by RAM 102 and/or the storage device 103.

The session establishing unit 111 establishes a session between the ePOS 10 and the mobile device 20. The session establishing unit 111 broadcasts connection information. The connection information is for example data indicating that the ePOS 10 is able to reward the user, i.e. the ePOS 10 provides a point reward program in this embodiment. The connection information may be a paring request when Bluetooth (trademark) technology is used. The session establishing unit 111 receives reply from the mobile device 20 and establishes a session with the mobile device 20 according to well-known communication technique. The session establishing unit 111 may exchange pass-key with the mobile device 20 to establish the paring when Bluetooth (trademark) technology is used. The session establishing unit 111 also transmits brand information such as a store name and service name and device information indicating capabilities of the ePOS 10 to the mobile device 20.

The key storage 115 stores a key for encrypting/decrypting data. In this embodiment, a common key is used for both encryption and decryption. However, it is possible to use public and private keys for public-key cryptography and the key storage 115 stores the public and private keys.

The reward section 112 executes processes to reward the user. The reward section 112 includes a reward request receiving unit 121, a transaction data retrieving unit 122, a reward generating unit 123, and a transaction data transmitting unit 124.

The reward request receiving unit 121 receives a request for rewarding the user (hereinafter referred to as "reward request") from the mobile device 20. The reward request includes an identification of the user (hereinafter referred to as "user ID").

The transaction data retrieving unit 122 retrieves from the POS unit 114 data related to transaction(s) done by the POS unit 114 (hereinafter this data is referred to as "transaction data"). In this embodiment, the transaction data includes the timestamp of the transaction. The transaction data may also include various information regarding the transaction such as purchased amount of goods and so forth.

The reward generating unit 123 generates rewards based on the transaction data. In this embodiment, the reward generating unit 123 may generates the amount of points to be awarded to the user based on the purchased amount included in the transaction data.

The transaction data transmitting unit 124 transmits the transaction data attached with the rewards (the amount of points) to the mobile device 20. The transaction data transmitting unit 124 encrypts the transaction data using the key stored in the key storage 115 and attaches the amount of points to the encrypted transaction data before the transmission.

The redemption section 113 executes processes to redeem the rewards. The redemption section 113 includes a token receiving unit 131, a token verifying unit 132, a redemption processing unit 133, and a completion data transmitting unit 134.

The token receiving unit 131 receives from the mobile device 20 a token which is issued by the server 30 and indicates the redemption is available. As described later, the token is generated and encrypted by the server 30 and is forwarded by the mobile device 20 to the ePOS 10. In this embodiment, the token includes the amount of points to redeem.

The token verifying unit 132 verifies the token received from the mobile device 20. The token verifying unit 132 decrypts the token using the key stored in the key storage 115. The token verifying unit 132 may determine that the token is valid when the token is successfully decrypted. Further, the token verifying unit 132 may use general technique to verify data such as computing hash code of the token and comparing the hash code attached with the token and so forth. In this embodiment, the token includes the datetime of issuance and the token verifying unit 132 checks if the datetime is within a predetermined terms to determine if the token is valid. When the token is successfully verified, the redemption to the user is permitted.

The redemption processing unit 133 executes processes related to the redemption. For example, the redemption processing unit 133 may display on the display 12 that the user should be rewarded so that the clerk at the shop provided with the ePOS 10 may give gifts to the user. Further, for example, the redemption processing unit 133 may display the amount of points to be redeemed on the display 12 so that the clerk sees the amount and makes a discount. Further for example, the redemption processing unit 133 may send a command for discount in which the amount of points is included to the POS unit 114 so that the POS unit 114 makes a discount according to the amount of points.

The completion data transmitting unit 134 transmits data indicating that the points are redeemed (hereinafter referred to as "completion data"). Upon transmission, the completion data transmitting unit 134 sets to the completion data the brand information and the amount of redeemed points and encrypts the completion data using the key stored in the key storage 115.

The POS unit 114 executes various processes in connection with POS system. The processes executed by the POS unit 114 are assumed to be well-known processes done in general POS systems so that the detailed explanation of the POS unit 114 is omitted.

Mobile Device 20

FIG. 4 shows an example of a hardware configuration of the mobile device 20. As shown FIG. 4, the mobile device 20 includes CPU 201, RAM 202, a flash memory 203, a communication device 204, a Bluetooth (trademark) unit 205, and a touch panel display 206. The flash memory 203 stores data and programs. CPU 201 retrieves the program stored in the flash memory 203 to RAM 202 and executes the program to realize various functions. The wireless communication device 204 is a device for wireless communication using the channel 42. The wireless communication device 204 may be a WiFi communication device, wireless transmitter, a communication device for mobile phone and so forth. The Bluetooth (trademark) unit 205 transmits/receives data to/from the channel 41 using Bluetooth (trademark) LE technology. The touch panel display 206 input/output data to/from the user.

FIG. 5 shows an example of a software configuration of the mobile device 20. As shown FIG. 5, the mobile device 20 includes a session establishing unit 211, a reward section 212, a redemption section 213, a transaction storage 241, a reward storage 242, and a redemption storage 243. The session establishing unit 211, the reward section 212 and the redemption section 213 are are realized for example by CPU 201 retrieving the program stored in the flash memory 203 to RAM 202 and executing the program. The transaction storage 241, the reward storage 242, and the redemption storage 243 are realized for example as a storage area provided by RAM 102 and/or the flash memory 203.

The session establishing unit 211 establishes a session between the mobile device 20 and the ePOS 10. The session establishing unit 211 detects the connection information broadcasted by the ePOS 10. The session establishing unit 211 determines that the ePOS 10 provides point reward program based on the connection information.

The transaction storage 241 stores a history of the transaction data. FIG. 6 shows an example of a configuration of the transaction data stored in the transaction storage 241. As shown in FIG. 6, the transaction data includes columns of datetime, brand, and transaction. The column of datetime is the datetime when the transaction is done. The column of brand is the brand information broadcasted by the ePOS 10 when establishing connection. The column of transaction is information regarding the transaction done by the ePOS 10. In the example of FIG. 6, the column shows that a purchase of JPY 1,000 was done by the ePOS 10. Referring to the transaction storage 241 the mobile device 20 can display the history of the transaction to the user.

The reward storage 242 stores the rewards awarded to the user. FIG. 7 shows an example of a configuration of the reward storage 242. In this embodiment, the reward storage 242 stores the amount of points as shown in FIG. 7.

The reward section 212 executes processes to reward the user. The reward section 212 includes a reward request transmitting unit 221, a transaction data forwarding unit 222 and a reward data receiving unit 223.

The reward request transmitting unit 221 transmits the reward request. When the session establishing unit 211 detects that the ePOS 10 provides the point reward program and unless the user inputs a command to redeem points, the reward request transmitting unit 221 transmits the reward request to the ePOS 10. The reward request transmitting unit 221 sets the user ID, which indicates the user who is using this mobile device 20, to the reward request.

The transaction data forwarding unit 222 forwards the transaction data to the server 30 when the transaction data forwarding unit 222 receives the transaction data from the ePOS 10. The transaction data forwarding unit 222 temporarily stores in the RAM 202 and/or flash memory 203 the amount of points attached to the transaction data. The transaction data forwarding unit 222 attaches the user ID and personal password to the transaction data when forwarding. As described later, this temporary amount of points will be permanently stored in the reward storage 242 when the transaction data is verified in the server 30 and the reward data is received from the server 30.

The reward data receiving unit 223 receives data indicating that the user is rewarded (hereinafter referred to as "reward data") from the server 30. As described later, the reward data is transmitted by the server 30 when the server 30 verified the transaction data. The reward data receiving unit 223 adds the temporary amount of points stored in the RAM 202 to the amount stored in the reward storage 242 so that the temporary amount of points is stored permanently. In this embodiment, the server 30 also transmits the decrypted transaction data along with the reward data. The reward data receiving unit 223 receives the transaction data and stores the transaction data in the transaction storage 241.

The redemption storage 243 stores data regarding the reward redeemed to the user (hereinafter referred to as "redemption data"). FIG. 8 shows an example of a configuration of the redemption data stored in the redemption storage 243. As shown in FIG. 8, the reward data includes columns of datetime, brand, and points. The column of datetime is when the points are redeemed. The column of the brand is the brand in-formation broadcasted by the ePOS 10 when establishing connection. The column of points is the amount of points which is redeemed.

The redemption section 213 executes processes to redeem the rewards. The redemption section 213 includes a redeem request transmitting unit 231, a token forwarding unit 232, a completion data forwarding unit 233, and a redemption data receiving unit 234.

The redeem request transmitting unit 231 transmits a request to redeem the points (hereinafter referred to as "redeem request") to the server 30 when the user inputs the command to redeem points. The redeem request transmitting unit 231 sets to the redeem request the user ID and the amount of points to redeem.

The token forwarding unit 232 forwards the token attaching the user ID to the ePOS 10 when the token forwarding unit 232 receives the token issued from the server 30.

The completion data forwarding unit 233 forwards the completion data to the server 30 when the completion data forwarding unit 233 receives the completion data from the ePOS 10.

The redemption data receiving unit 234 receives the redemption data from the server 30. As described later, the server 30 issues the redemption data when the server 30 verified the completion data. The redemption data includes the brand information and the amount of redeemed points (in this context, the redemption data may be the same as the completion data). The redemption data receiving unit 234 subtracts the amount of redeemed points included in the redemption data from the amount stored in the reward storage 242.

Server 30

FIG. 9 shows an example of a hardware configuration of the server 30. As shown in FIG. 9, the server 30 includes CPU 301, RAM 302, a storage device 303, a communication device 304, input device 305, and output device 306. The storage device 303 is for example a hard disk drive, solid state drive, flash memory, and so forth which stores data and programs. CPU 301 retrieves the program stored in the storage device 303 to RAM 302 and executes the program to realize various functions. The communication device 304 is a device for communication using the channel 42. The communication device 304 may be an adapter of the Ethernet (trademark), a modem for communication via telephone lines, a WiFi communication device, a wireless transmitter, a communication device for mobile phone and so forth which performs communication via channel 42. The input device 305 is for example a keyboard, a mouse, a microphone, a touch panel, and so forth which accepts data input from the user. The output device 306 is for example a display device, a speaker, and so forth which output data to the user.

FIG. 10 shows an example of a software configuration of the server 30. As shown in FIG. 10, the server 30 includes a reward section 311, a redemption section 312, a transaction database 341, a customer database 342, a redemption database 343, and a key storage 344.

The transaction database 341 stores histories of the transaction data for each user. FIG. 11 shows an example of the transaction data stored in the transaction database 341. Compared to the transaction storage 241 shown in FIG. 6, in the transaction database 341, the transaction data is stored along with the user ID.

The customer database 342 stores information regarding the user (hereinafter referred to as "customer data"). The customer data includes the rewards (amounts of points) awarded to each user. FIG. 12 shows an example of configuration of the customer database 342. As shown in FIG. 12, the customer data includes the user ID, user's name (username), user's password which may be encrypted, the amount of points, and so forth. The customer data may include further items regarding the user such as for example age, address, points of interest, and so forth.

The reward section 311 executes processes to reward the user. The reward section 311 includes a transaction data receiving unit 321, a transaction data verifying unit 322, and a reward data transmitting unit 323.

The transaction data receiving unit 321 receives from the mobile device 20 the transaction data transmitted by the ePOS 10 and forwarded by the mobile device 20.

The transaction data verifying unit 322 verifies the transaction data received from the mobile device 20. As described above, the transaction data is encrypted in the ePOS 10. The transaction data verifying unit 322 decrypts the transaction data using the key stored in the key storage 344. The transaction data verifying unit 322 may determine that the transaction data is valid when the transaction data is successfully decrypted. Further, the transaction data verifying unit 322 may use general techniques to verify data such as computing hash code of the transaction data and comparing the hash code attached with the transaction data. The transaction data verifying unit 322 stores the decrypted transaction data to the transaction database 341 along with the user ID attached to the transaction data. The transaction data verifying unit 322 adds the amount of points attached to the transaction data to the amount stored in the customer database 342 corresponding to the user ID included in the transaction data.

The reward data transmitting unit 323 transmits the reward data to the mobile device 20 when the transaction data is successfully verified. In this embodiment, the reward data transmitting unit 323 also transmits the decrypted transaction data with the reward data to the mobile device 20. When the transaction data is successfully verified, the reward data transmitting unit 323 also adds the amount of points which was attached to the transaction data to the amount in the customer database 342 corresponding to the user ID attached to the transaction data. Further, the reward data transmitting unit 323 stores the decrypted transaction data along with the user ID attached to the transaction data. When the verification of the transaction data fails, the reward data transmitting unit 323 transmits an error to the mobile device 20.

The redemption storage 243 stores the redemption data. FIG. 13 shows an example of a configuration of the redemption data stored in the redemption storage 243. As shown in FIG. 13, the redemption data includes columns of user ID, datetime, brand, and points. The column of the user ID is an identification of the user to which the points are redeemed. The column of datetime is when the points are redeemed. The column of the brand is the brand information broadcasted by the ePOS 10 when establishing connection. The column of points is the amount of points which is redeemed.

The redemption section 312 executes processes to redeem the rewards. The redemption section 312 includes a redeem request receiving unit 331, a redemption verifying unit 332, a token generating unit 333, a token transmitting unit 334, a completion data receiving unit 335, and a redemption data transmitting unit 336.

The redeem request receiving unit 331 receives the redeem request from the mobile device 20.

The redemption verifying unit 332 verifies the redeem request. The redemption verifying unit 332 retrieves the amount of points corresponding to the user ID attached to the redeem request from the customer database 342, compares the retrieved amount to the amount of points to redeem attached to the redeem request, and determine if the retrieve amount is more than or equal to the amount of points to redeem. When the retrieve amount is more than or equal to the amount of points to redeem, the redemption verifying unit 332 determines that the redeem request is valid.

The token generating unit 333 issues a token when the redeem request is determined as valid. The token generating unit 333 sets to the token the current datetime, the effective period, and the amount of points to redeem. The token generating unit 333 encrypts the token using the key stored in the key storage 344.

The token transmitting unit 334 transmits the encrypted token to the mobile device 20.

The completion data receiving unit 335 receives from the mobile device 20 the completion data transmitted by the ePOS 10 and forwarded by the mobile device 20. The completion data receiving unit 335 decrypts the completion data using the key stored in the key storage 344. The completion data receiving unit 335 invalidates the token. The completion data receiving unit 335 stores the redeemed points, i.e. the completion data receiving unit 335 subtracts the amount of the redeemed points from the amount corresponding to the user ID in the customer database 342. The completion data receiving unit 335 generates the redemption data including the brand information and the amount of redeemed points included in the completion data, and stores the redemption data in the redemption database 343.

The redemption data transmitting unit 336 transmits the generated redemption data to the mobile device 20.

Process

The processes executed by the transaction system of this embodiment are outlined below. FIG. 14 shows a general outline of processes of the transaction system. At first, the session between the ePOS 10 and the mobile device 20 is established as disclosed in FIG. 15 (S501). The redeem request transmitting unit 231 of the mobile device 20 checks if the amount of points stored in the reward storage 242 is more than or equal to the predetermined minimum points for redemption (S502). If the amount is more than or equal to the minimum points (S502:YES), the redeem request transmitting unit 231 ask the user if the user wants to redeem points (S503). The redeem request transmitting unit 231 may for example display a popup dialog on the touch panel display 206 and may accept an input from the user if the points is to be redeemed. The redeem request transmitting unit 231 may beep, play sounds, and/or actuate the vibrator to get the user's attention. The redeem request transmitting unit 231 may determine that the user does not redeem points without input from the user.

If the amount of points is less than the minimum points (S502:NO) or the user does not want to redeem points (S503:NO), the reward process shown in FIG. 16 is executed (S504). Otherwise (S503:YES), the redemption process shown in FIG. 17 is executed (S505).

Establishing Session

FIG. 15 is a sequence diagram of the session establishment.

The session establishing unit 111 of the ePOS 10 broadcast the connection information (S521). The session establishing unit 211 of the mobile device 20 detects the connection information broadcasted by the ePOS 10 (S522) and transmits a response to the ePOS 10 (S523). The session establishing unit 111 transmits the brand information and the device information to the mobile device 20 in response to the response transmitted from the mobile device 20 (S524).

The session establishing unit 211 determines that the ePOS 10 provides the point reward program based on the brand and device information (S525). If the session establishing unit 211 determines that the point reward program is not provided by the ePOS 10, the session establishing unit 211 may terminate the process. If the session establishing unit 211 determines that the point reward program is provided, the reward request transmitting unit 221 of the mobile device 20 transmits the reward request to the ePOS 10 (S526). The session establishing unit 111 and the session establishing unit 211 make some negotiation according to general technique of establishing a communication session to establish the session (S527).

As described above, the session is established between the ePOS 10 and the mobile device 20 through which the ePOS 10 and the mobile device 20 may transmit and receive data to and from each other.

Reward Process

FIG. 16 is a sequence diagram of the reward process.

The transaction data retrieving unit 122 waits for the transaction made by the POS unit 114 (S542) and retrieves the transaction data from the POS unit 114 (S543). The transaction data retrieving unit 122 also sets to the transaction data the user ID received from the mobile device 20. The reward generating unit 123 generates the amount of points to be rewarded based on the transaction data (S544). The reward generating unit 123 may for example compute the amount of points based on the purchased amount included in the transaction data. The transaction data transmitting unit 124 encrypts the transaction data using the key stored in the key storage 115 (S545). The transaction data transmitting unit 124 attaches the amount of points to be rewarded to the encrypted transaction data and transmits the encrypted transaction data with the amount to the mobile device 20 (S546).

The transaction data forwarding unit 222 receives the transaction data and temporarily stores the amount of points to be rewarded which is attached to the transaction data (S547). The transaction data forwarding unit 222 forwards the transaction data with the amount to the server 30 (S548).

The transaction data receiving unit 321 of the server 30 receives the transaction data from the mobile device 20 and the transaction data verifying unit 322 decrypts the transaction data (S549). The transaction data verifying unit 322 verifies the transaction data (S550). The transaction data verifying unit 322 stores the decrypted transaction data in the transaction database 341 (S551) and add the amount of points attached to the transaction data to the amount stored in the customer database 342 corresponding to the user ID included in the transaction data (S552) when the transaction data is successfully verified. The reward data transmitting unit 323 transmits the reward data and the decrypted transaction data to the mobile device 20 (S553).

The reward data receiving unit 223 of the mobile device 20 receives the reward data and the decrypted transaction data, stores the transaction data in the transaction storage 241 (S554), and adds the temporary amount of points stored in RAM 202 to the amount stored in the reward storage 242 (S555).

As described above, according to the transaction system of this embodiment, the mobile device 20 may automatically detect the ePOS 10 which provides a point reward program and may automatically execute the reward process using the Bluetooth (trademark) LE technology. Therefore, the action of the user is not required to join to the reward program.

Redeem Process

FIG. 17 is a sequence diagram of the redeem process.

The redeem request transmitting unit 231 accepts the amount of points to redeem input from the user (S561) and transmits to the server 30 the redeem request including user ID and the input amount of points (S562).

The redeem request receiving unit 331 of the server 30 receives the redeem request and the redemption verifying unit 332 verifies the redeem request (S563). The token generating unit 333 issues a token including the current datetime, effective period and the amount of points to redeem when the redeem request is successfully verified and encrypts the token using the key stored in the key storage 344 (S564). The token transmitting unit 334 transmits the token to the mobile device 20 (S565).

The token forwarding unit 232 receives the token and forwards the token to the ePOS 10 (S566).

The token receiving unit 131 of the ePOS 10 receives the token and the token verifying unit 132 decrypts the token using the key stored in the key storage 115 (S567). The redemption processing unit 133 executes processes related to the redemption (S568). For example, the redemption processing unit 133 may send a command for discount including the amount of points to redeem to the POS unit 114 so that the POS unit 114 makes a discount according to the amount. The completion data transmitting unit 134 generates the completion data including the brand in-formation and the amount of redeemed points, encrypts the completion data using the key stored in the key storage 115, and transmits the encrypted completion data to the mobile device 20 (S569).

The completion data forwarding unit 233 of the mobile device 20 receives the completion data from the ePOS 10 and forwards the completion data to the server 30 (S570).

The completion data receiving unit 335 of the server 30 receives the completion data and decrypts the completion data (S571), invalidates the token (S572). The completion data receiving unit 335 generates the redemption data including the brand information and the amount of redeemed points included in the completion data, and stores the redemption data in the redemption database 343 and subtracts the amount of the redeemed points from the amount corresponding to the user ID in the reward database 342 (S573). The redemption data transmitting unit 336 transmits the redemption data to the mobile device 20 (S574).

The redemption data receiving unit 234 of the mobile device 20 receives the redemption data and subtracts the amount of redeemed points included in the redemption data from the amount stored in the reward storage 242 (S575).

As described above, since the mobile device 20 forwards the transaction data, the token and the completion data between the POS 10 and the server 30, the POS 10 is not required to be connected to a wide area network such as the Internet to communicate with the server 30. Therefore, the security issue caused by connecting to the Internet can be reduced for the POS 10. In addition, the store to which the POS 10 is provided does not need to be equipped with communication facilities. The transaction system according to this embodiment may be applied to a stand-alone store without communication facilities.

Variant Application

Although the transaction system includes single ePOS 10 in this embodiment, of course, a plurality of ePOS 10 may be provided.

Further, although the transaction system includes a single mobile device 20 in this embodiment, a plurality of mobile devices 20 may be connected to the ePOS 10. In this situation, the ePOS 10 may compute the distance to each of the mobile devices 20 and transmits the connection information only to the closest mobile device 20 and establish a session only with the closest device. The ePOS 10 may transmit the connection in-formation only when the distance is less than or equal to the predetermined value.

Further, although the ePOS 10 comprises a Bluetooth (trademark) unit 107 which can communication using Bluetooth(trademark) LE technology in this embodiment, the ePOS 10 may comprise a wireless communication unit which can communicate using the other wireless communication technology instead of the Bluetooth(trademark) unit 107. A light weight communication technology is preferred to be used in the wireless communication unit.

Further, although the ePOS 10 is implemented by a single computer device, the ePOS 10 may be implemented by a plurality of devices. For example, ePOS 10 may be implemented by a legacy POS device and a reward device which is connected to the legacy POS device and is able to control the legacy POS device and transmit/receive data to/from the legacy POS device. The reward device may be a computer comprising a CPU, a memory, a storage device, a wireless communication unit, and so forth and the function other than the POS unit 114 described in this embodiment may be realized by the reward device. In this way, it is possible to use legacy POS devices which do not have a communication unit for rewarding the user in the way described in this embodiment.

Further, although in this embodiment a smartphone device is assumed as the mobile device 20, the mobile device 20 may be any portable device which may communicate with both ePOS 10 and server 30 wirelessly. For example, the mobile device 20 may be a mobile phone without touch panel display or a notebook computer.

Further, although in this embodiment, the Point of Sale device is assumed as a transaction device, other devices regarding the transaction can be assumed. For example, a vending machine can be used instead of the ePOS 10.

Further, although in this embodiment the mobile device 20 stores the amount of points in the reward storage 242 and the server 30 stores the amount of points in the customer database 342, the mobile device 20 and/or server 30 may not store the amount and may calculate the amount from the transaction data and the redemption data.

Further, although in this embodiment the amount of points to be rewarded to the user is calculated according to the purchased amount for example, the transaction data can be data which is not related to the economic transaction and the points can be rewarded to the user for the fact that the mobile device 20 connected to the ePOS 10.

Further, although in this embodiment the redeem request transmitting unit 231 checks if the user wants to redeem points at first, the redeem request transmitting unit 231 may automatically execute the reward process.

Further, the transaction data may further include information regarding the store or the ePOS 10 such as inventory information. In this way, the server 30 can retrieve the inventory information using the customer's mobile device 20 in compensation for the rewards. Therefore, it becomes easy to retrieve the inventory information from the ePOS 10. This is especially effective when a vending machine is used instead of the ePOS 10. The inventory information can be easily retrieved from the vending machine without connection to the wide area network such as the Internet using the capability of connection to the wide area network which the customer's mobile device 20 has.

Hereinabove, description was given of embodiments of the present invention, however, the above-described embodiment is intended to facilitate understanding of the present invention and should not be construed as limited to the embodiments set forth here. The present invention may be modified and improved without departing from the scope of the invention, and equivalents thereof are also encompassed by the invention.

REFERENCE SIGNS LIST

10 POS
20 mobile device
30 server
111 session establishing unit
112 reward section
113 redemption section
114 POS unit
115 key storage
121 reward request receiving unit
122 transaction data retrieving unit
123 reward generating unit
124 transaction data transmitting unit
131 token receiving unit
132 token verifying unit
133 redemption processing unit
134 completion data transmitting unit
211 session establishing unit
212 reward section
213 redemption section
221 reward request transmitting unit
222 transaction data forwarding unit
223 reward data receiving unit
231 redeem request transmitting unit
232 token forwarding unit
233 completion data forwarding unit
234 redemption data receiving unit
241 transaction storage
242 reward storage
243 redemption storage
311 reward section
312 redemption section
321 transaction data receiving unit
322 transaction data verifying unit
323 reward data transmitting unit
331 redeem request receiving unit
332 redemption verifying unit
333 token generating unit
334 token transmitting unit
335 completion data receiving unit
336 redemption data transmitting unit
341 transaction database
342 customer database
343 redemption database
344 key storage

The invention claimed is:

1. A method for controlling a mobile device having different first and second wireless communication devices, the method comprising:
    establishing a session between the first communication device of the mobile device and a transaction device, the session being via a first wireless channel;
    transmitting, by the second communication device of the mobile device to a server, a reward redeem request including a user ID of the mobile device via a second wireless channel with a communication-available range wider than that of the first wireless channel;
    receiving, from the server to the mobile device and via the second wireless channel, a token issued in response to the sent reward redeem request when the server determines the reward redeem request is valid;
    transmitting, by the mobile device to the transaction device and via the first wireless channel, the received token so that the mobile device acts as an intermediary between the server and the transaction device for receiving and transmitting the token issued by the server to the transaction device avoiding a requirement that the transaction device be connected to a wide area network to communicate with the server;
    receiving, from the transaction device to the mobile device and via the first wireless channel, a completion data transmitted from the transaction device after reward redemption is executed at the transaction device in response to the sent token, the completion data indicating that the reward redemption has been executed;
    forwarding, by the mobile device to the server and via the second wireless channel, the received completion data so that the mobile device again acts as the intermediary between the transaction device and the server for receiving and forwarding the completion data generated by the transaction device to the server again avoiding the requirement that the transaction device be connected to a wide area network to communicate with the server; and
    updating rewards belonging to the user of the mobile device at the mobile device according to contents of the reward redemption.

2. The method according to claim 1, wherein the transaction device and the server have a common key and the mobile device does not have the common key, and
    wherein the token is encrypted using the common key at the server and decrypted using the common key at the transaction device.

3. The method according to claim 1, further comprising:
receiving, from the server and via the second wireless channel, a redemption data generated in response to the sent completion data, and
wherein the updating includes updating the rewards belonging to the user of the mobile device based on the received redemption data.

4. The method according to claim 3, wherein the transaction device and the server have a common key, and
wherein the completion data is encrypted using the common key at the transaction device and decrypted using the common key at the server, and
wherein the redemption data is not encrypted using the common key.

5. A mobile device having different first and second wireless communication devices, comprising:
a session establishing unit configured to establish a session between the first communication device of the mobile device and a transaction device, the session being via a first wireless channel;
a redeem request transmitting unit configured to transmit, by the second communication device of the mobile device to a server, a reward redeem request including an user ID of the mobile device via a second wireless channel with a communication-available range wider than that of the first wireless channel;
a token forwarding unit configured to receive, from the server and via the second wireless channel, a token issued in response to the sent reward redeem request when the server determines the reward redeem request is valid and to transmit, to the transaction device and via the first wireless channel, the received token so that the mobile device acts as an intermediary between the server and the transaction device for receiving and transmitting the token issued by the server to the transaction device avoiding a requirement that the transaction device be connected to a wide area network to communicate with the server;
a receiving unit configured to receive, from the transaction device and via the first wireless channel, a completion data transmitted from the transaction device after a reward redemption is executed at the transaction device in response to the sent token, the completion data indicating that the reward redemption has been executed;
a forwarding unit configured to forward, to the server and via the second wireless channel, the received completion data so that the mobile device again acts as the intermediary between the transaction device and the server for receiving and forwarding the completion data generated by the transaction device to the server again avoiding the requirement that the transaction device be connected to a wide area network to communicate with the server; and
a process unit configured to update rewards belonging to the user of the mobile device at the mobile device according to contents of the reward redemption.

6. A non-transitory computer-readable medium storing computer executable instructions for causing a mobile device having different first and second wireless communication devices to perform a method comprising:
establishing a session between the first communication device of the mobile device and a transaction device, the session being via a first wireless channel;
transmitting, by the second communication device of the mobile device to a server, a reward redeem request including an user ID of the mobile device via a second wireless channel with a communication-available range wider than that of the first wireless channel;
receiving, from the server to the mobile device and via the second wireless channel, a token issued in response to the sent reward redeem request when the server determines the reward redeem request is valid;
transmitting, by the mobile device to the transaction device and via the first wireless channel, the received token so that the mobile device acts as an intermediary between the server and the transaction device for receiving and transmitting the token issued by the server to the transaction device avoiding a requirement that the transaction device be connected to a wide area network to communicate with the server;
forwarding, from the transaction device to the mobile device and via the first wireless channel, a completion data transmitted from the transaction device after a reward redemption is executed at the transaction device in response to the sent token, the completion data indicating that the reward redemption has been executed;
transmitting, by the mobile device to the server and via the second wireless channel, the received completion data so that the mobile device again acts as the intermediary between the transaction device and the server for receiving and forwarding the completion data generated by the transaction device to the server again avoiding the requirement that the transaction device be connected to a wide area network to communicate with the server; and
updating rewards belonging to the user of the mobile device at the mobile device according to contents of the reward redemption.

7. The method according to claim 1, wherein the rewards are points and wherein the redeem request includes the number of points to use and wherein the completion data indicates that points has been used, and
wherein the server, in response to the completion data received from the mobile device via the second wireless channel, updates points of the user of the mobile device.

8. The method according to claim 1, wherein the transaction device is a vending machine which is not connected to wide area network to which the server is connected.

9. The method according to claim 1, wherein the first communication device is a Bluetooth unit of the mobile device whereby having the mobile device act as the intermediary between the transaction device and the server avoids the requirement that the transaction device be connected to a wide area network to communicate with the server.

10. The method according to claim 1, wherein after the completion data is transmitted to the server and the rewards belonging to the user are updated at the server, the method further comprising invalidating the token at the server.

* * * * *